Oct. 27, 1953     T. W. PAUL     2,656,665
COTTON HARVESTER

Original Filed July 18, 1949     3 Sheets-Sheet 1

INVENTOR.
TALBERT W. PAUL

ATTORNEYS

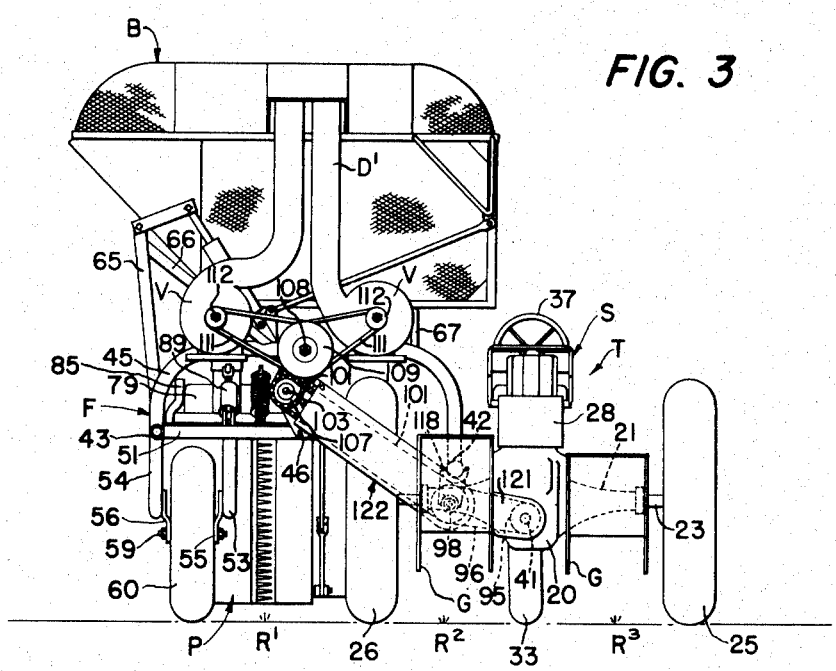
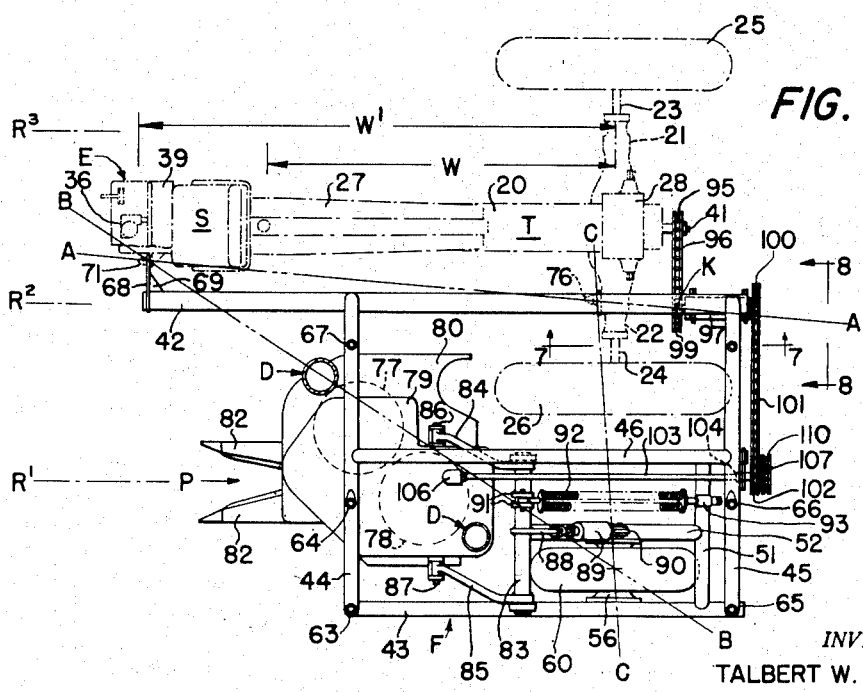

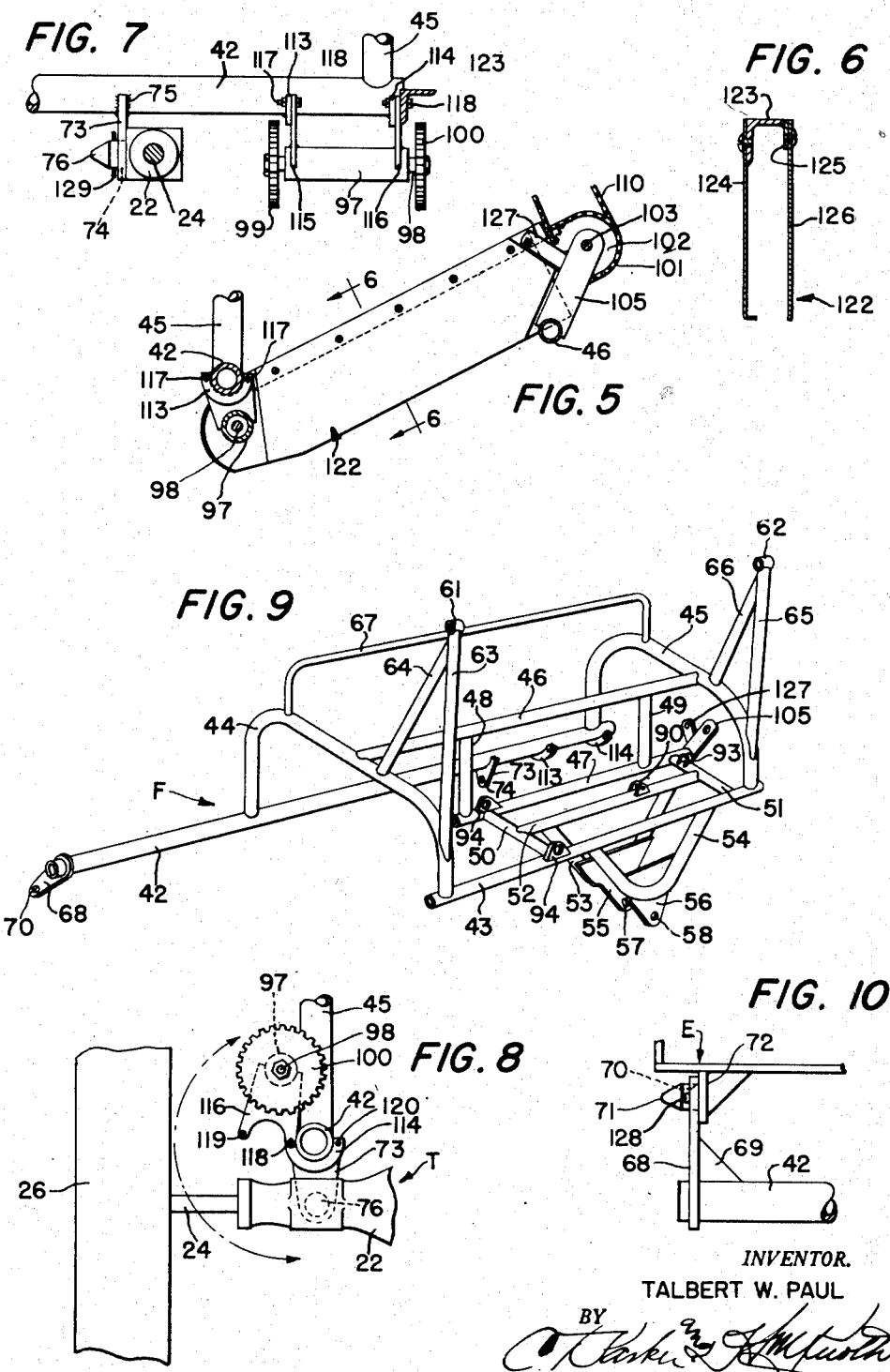

Patented Oct. 27, 1953

2,656,665

UNITED STATES PATENT OFFICE 2,656,665

COTTON HARVESTER

Talbert W. Paul, Moline, Ill., assignor to Deere & Company, Moline, Ill., a corporation of Illinois Original application July 18, 1949, Serial No. 105,286. Divided and this application July 19, 1951, Serial No. 237,610

3 Claims. (Cl. 56—28)

This invention relates to secondary or auxiliary frame structure for attachment to tractors or like vehicles. More particularly, the invention relates to a frame adapted to carry a harvesting unit and associated components in side-by-side relationship with a conventional agricultural tractor or similar vehicle.

This application is a division of my co-pending application, Ser. No. 105,286, filed July 18, 1949, now U. S. Patent 2,630,870, issued March 10 1953.

The conventional agricultural tractor, like any other vehicle of limited application, although designed for use with a relatively wide variety of machinery and implements, is not primarily designed for the superimposition thereon of relatively heavy or bulky machinery or implements. An example of such machine is the cotton harvester or picker.

The cotton picker currently developed and found to be most satisfactory under all conditions includes a relatively large picking unit having picking drums rotatable about parallel vertical axes for picking cotton from the plants, and in addition includes doffing mechanism also rotatable about parallel vertical axes for removing the picked cotton from the picking spindles of the drum. The picker has conveying means, ordinarily of the pneumatic type, for conveying the picked and doffed cotton to a receptacle which, according to a preferred design, is carried by the same vehicle that carries the picking unit. The entire arrangement must be such that it can be readily propelled through the cotton field, either by a vehicle built especially for the purpose or by a tractor to which the picking machine is attached. Obviously, a picker that has its own specially built propelling unit presents problems quite different from those encountered in the design of a picking machine developed for attachment to a conventional tractor or like vehicle, for in the former case the propelling unit is initially designed to carry and propel the picker, whereas in the latter case, the design of the picker must be adapted as fully as possible to the standardized design of the tractor.

On the other hand, an ordinary tractor may be adapted to carry a specially designed picker by furnishing with the picker various conversion parts the use of which in effect amounts to a complete redesign of the tractor. This is not always desirable, since it withdraws the tractor from use for other purposes. Therefore, an important factor to be considered is the adaptation of the picking machine to a standard tractor without materially modifying the design of the tractor, so that the picker may be readily removed from the tractor and the tractor used for other purposes. Obviously, of course, the picker could be built as a machine to be drawn behind the tractor. However, as in many cases of drawn implements or machines, the problem then becomes one of facility in operation, since the tractor operator is too far removed from the picker to efficiently control the latter.

According to the present invention, there is provided an auxiliary wheeled frame positionable alongside a conventional tractor or like vehicle, this frame having a single wheel disposed in transverse alinement with one of the rear traction wheels of the tractor and further having means at longitudinally spaced portions for connection to the tractor on a generally longitudinally extending pivot axis. These mounting means are preferably located in such manner as to superimpose at least part of the load of the auxiliary frame on the tractor at such points as to equally distribute the weight of the picking machine between the tractor and the carrying wheel of the auxiliary frame. In the design of a machine of this type, adequate consideration must be given to the provision and location of load-sustaining means in relation to the basic design of the tractor. For example, rear end portions of the tractor are more suitably adapted than are the front portions of the tractor to carry superimposed loads. Further, the greater the load imposed at the forward end of the tractor, the more difficult it is to control the tractor and picker when operated as a unit. Another factor to be considered is the general stability of the tractor as such, wherefore it becomes important in the provision of the auxiliary frame to locate the various components of the picker, or other harvesting unit, at such points as to improve, if possible, the stability characteristics of the tractor, and particularly the stability characteristics of the machine as a whole. Along with this consideration, there are those that involve the arrangement of the picking machine components in such manner that there is caused little, if any, alteration in the tractor, to the end that the picker may be readily attached to and detached from the tractor so that the tractor may be used for other purposes.

The invention further contemplates the provision of a novel auxiliary frame structure which is specially designed to accommodate the attachment thereto of the picker and associated components and the attachment thereof to a tractor of one well-known type. Further objects of the invention are to provide a frame that is simple and durable in construction; to achieve an auxiliary frame which has three load-sustaining elements arranged respectively at the apices of a triangle (as viewed from above), one of these load-sustaining elements comprising a carrying wheel or equivalent ground-engaging support for the auxiliary frame, and the other two load-sustaining elements constituting the mounting means for connecting the frame to the tractor. A still further object is to arrange the mounting means on the tractor in such position that the forward mounting means is located relatively close to the longitudinal center line of the tractor, where as the rear mounting means is located intermediate the tractor center line and the rear traction wheel at one side of the tractor, thus providing for the support of the frame on those portions of the tractor best adapted to carry the superimposed load.

It is an important object of the invention to arrange the mounting means so that they lie on a generally horizontal line that is non-parallel to the longitudinal center line of the tractor, thereby accommodating the laterally offset locations of the front and rear mounting means. In this respect, it is an important object to provide a drive shaft for the picker which is rotatable on a longitudinal axis intersecting the line of the pivot at a point cut by a transverse erect plane passing through the rearwardly projecting portion of a longitudinally extending power take-off shaft on the tractor, whereby a pair of sprockets or pulleys may be interconnected by a chain or belt lying in this plane, so that relative articulation between the tractor and the carrying frame about the aforesaid pivot may occur without varying the tension in the chain or belt.

Further objects of the invention reside in the arrangement of various components of the frame that facilitate mounting of the frame on and dismounting of the frame from the tractor, having specific reference to shiftably mounted parts that may be retracted or moved out of normal positions so that the mounting and dismounting of the frame and tractor may be accomplished by driving the tractor forwardly into or reversely out of the frame.

The foregoing and other important objects and desirable features inherent in and encompassed by the invention will become apparent to those versed in the art as a preferred form of the invention is fully disclosed in the following detailed description and accompanying sheets of drawings in which Figures 1 and 2 are respectively right-hand and left-hand elevational views of the tractor-mounted cotton harvester;

Figure 3 is a rear view of the structure shown in Figures 1 and 2;

Figure 4 is a plan view, with various components of the superstructure removed so that the view appears to be one taken generally on the line 4—4 of Figure 2, the tractor being shown in broken lines so that the relationship between the tractor and the auxiliary frame may be more readily comprehended;

Figure 5 is an enlarged fragmentary sectional view taken substantially on the line 5—5 of Figure 2 and showing a portion of the driving mechanism for the picker;

Figure 6 is a fragmentary sectional view, drawn to an enlarged scale, taken along the line 6—6 of Figure 5;

Figure 7 is an enlarged fragmentary side elevational view of the rear portion of the tractor, as viewed along the line 7—7 of Figure 4;

Figure 8 is an enlarged fragmentary rear elevational view taken substantially on the line 8—8 of Figure 4 and drawn to the scale of Figures 5 and 7;

Figure 9 is an enlarged perspective view of the auxiliary frame per se;

Figure 10 is an enlarged fragmentary plan view showing the forward mounting means or load-sustaining element.

In general

Figure 1:
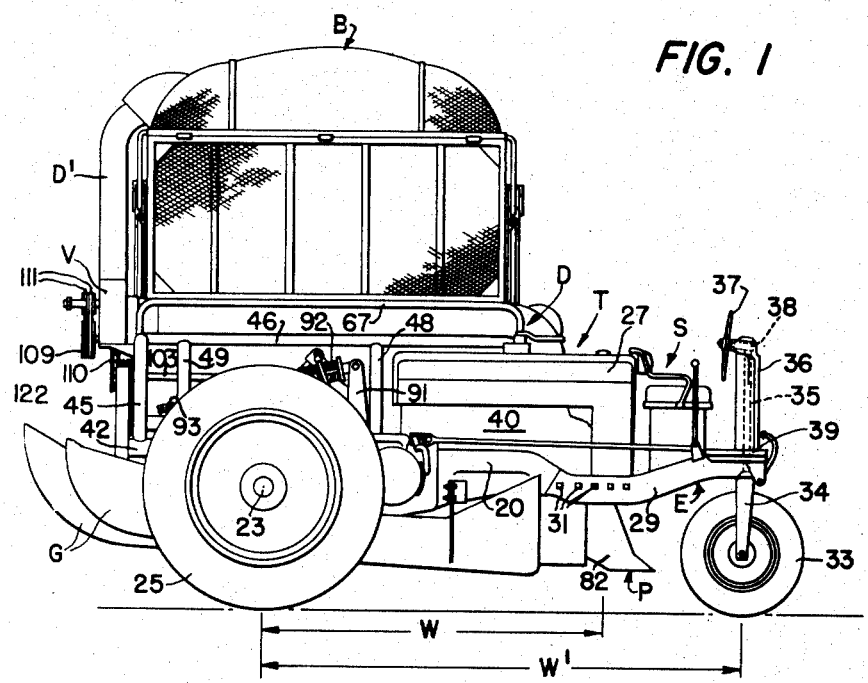

Briefly, and specifically, the harvesting unit disclosed comprises a tractor T alongside of which is disposed a lateral extension structure in the form of an auxiliary wheeled supporting frame F. This frame is connected to the tractor by mounting means providing a generally longitudinally extending, horizontal pivot axis A—A. The frame F carries a cotton-picking unit P and a cotton-receiving receptacle or basket B. The machine is operated with the picker P traveling along a row of cotton $R^1$ and the tractor straddling two adjacent rows $R^2$ and $R^3$. In the case of the particular tractor shown, the operator's station is located at the forward end of the tractor so as to afford a seat from which the operator may readily see the cotton plants entering the picker P.

The tractor is equipped with a pair of shields or guards G which run lengthwise of the tractor and which are provided for the purpose of protecting the plants in the rows $R^2$ and $R^3$ from damage by portions of the tractor which are not sufficiently high to clear the plants. Cotton picked by the picker P is conveyed therefrom to the basket B by means of a penumatic conveying means or system including intake ducts D, fans or blowers V and delivery ducts $D^1$.

In the foregoing description, and in that to follow specific references to the various structural components will be made in connection with the normal travel of the tractor, picking unit, and auxiliary frame. However, it will be obvious that the tractor and related parts may be reversed, for example, or arranged otherwise than as shown. Hence, such terms as "front," "rear," etc., should be considered as relative terms and the entire disclosure should be understood as representative of a preferred form of the invention and not as excluding other forms thereof that could be readily achieved on the basis of what is disclosed. Also, and for convenience, the expressions "inwardly" and "outwardly," used with respect to the location or position of a part relative to another, means that the parts are spaced apart in a lateral direction and the "inner" part, or the part disposed "inwardly," is proximate to the vehicle and the "outer" part, or the part disposed "outwardly," is relatively remote from the vehicle.

Tractor or propelling vehicle

The tractor illustrated in the drawings will be recognized as one of conventional design comprising a longitudinal, relatively narrow body 20 carried on rear ground-engaging means including a transverse, wide-tread rear axle structure made up of a pair of opposite, laterally outwardly extending axle housings 21 and 22. These axle housings respectively carry opposite, laterally outwardly extending driving axles 23 and 24, to which are respectively fixed traction wheels 25 and 26. It will be seen that the wheels 25 and 26 are relatively widely spaced apart so that the tractor axle may straddle the two rows $R^2$ and $R^3$, the tread lines of the wheels 25 being spaced apart transversely so that the wheel 25 travels to the right of the row R³ and the wheel 26 travels to the left of the row R² and substantially centrally between the rows R¹ and R².

Figure 2:
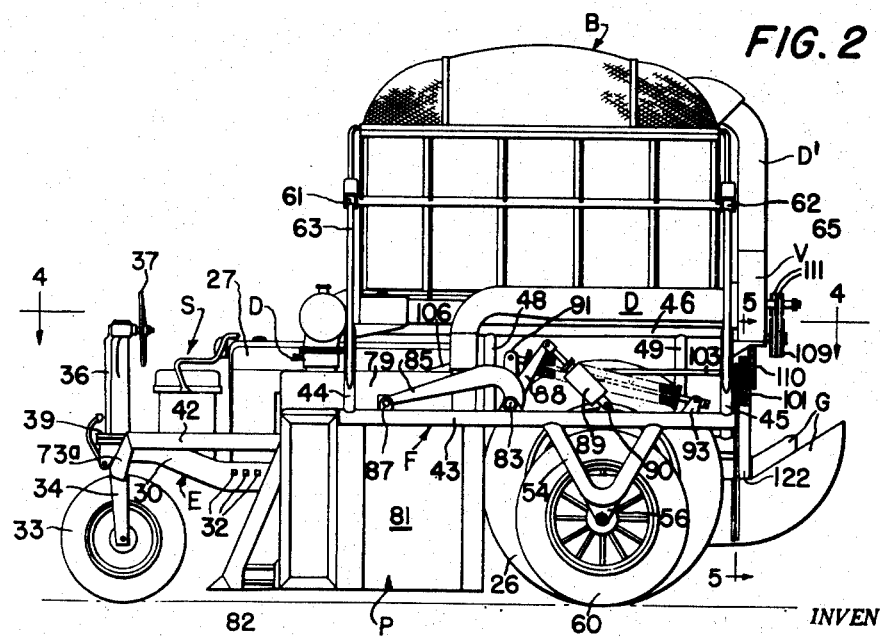

The tractor body 20 carries an engine hood and grille enclosure structure 27, ahead of which is located the operator's seat S. In the preferred construction illustrated, the seat S has been removed from a rearwardly located seat support 28 and has been installed in the place illustrated on a forward extension E of the tractor body. This extension includes an elongated attachment frame made up of a pair of longitudinal side members 29 and 30 (Figures 1 and 2) rigidly secured to opposite sides of the forward portion of the tractor body 20 by a plurality of attaching means such as cap screws 31 and 32, respectively. The extreme forward end of the extension E includes provision for the mounting thereon of ground-engaging means comprising steerable wheel means here in the form of a single wheel or truck 33 carried by a yoke 34 which in turn includes a vertical steering shaft 35 journaled in a column or casing 36. The upper portion of the column 36 carries a steering wheel 37 rotatable about a longitudinal horizontal axis and connected to the vertical steering shaft 35 by any suitable means, such as worm and gear mechanism represented generally by the numeral 38 (Figure 1). The wheel 33 travels between the pair of rows R² and R³.

The length of the extension E and the disposition of the steerable truck 33—34 is such as to dispose the steerable truck at a point considerably in advance of its original position on the tractor. This arrangement materially increases the wheel base of the tractor over the normal wheel base, as represented at W and W¹ in Figures 1 and 4. The dimension W represents the normal wheel base and the dimension W¹ represents the increased wheel base. The extension E is preferably constructed so that it may be readily installed at the forward end of the tractor and may readily utilize such conventional or standard parts of the tractor as the components 33, 34, 35, and 36. The steering wheel 37 may likewise be the standard steering wheel, removed from its normal position. The upper portion of the extension E may be provided as a platform 39 on which are grouped various controls for operating the tractor, the details of which form no part of the present invention.

The tractor is powered by the usual internal combustion engine, designated generally at 40 (Figure 1). The rear portion of the body 20 is in the form of a transmission and final-drive housing or casing which carries the customary transmission and differential gearing (not shown) for driving the axles 23 and 24. This gearing serves also to drive a longitudinally extending power take-off shaft 41 rotatable on a longitudinal horizontal axis and projecting rearwardly beyond the axle structure 21—22.

*Auxiliary or secondary load-carrying frame*

This frame has been briefly and previously referred to as the frame F that is mounted alongside the tractor. The general structure of this frame is best shown in Figure 9. As viewed from above, the frame F is an open, generally rectangular framework made up of a longitudinally extending first inner support or elongated inner frame element 42, preferably of tubular construction. Spaced laterally outwardly from the member 42 is an outer or second frame element or member 43, which is also tubular, as are the remaining elements of the frame F. The elements 42 and 43 are parallel and the member 42 is considerably elongated forwardly beyond the member 43. These members are supportingly interconnected by front and rear arched transverse or cross members 44 and 45 between upper intermediate portions of which extends and is rigidly secured an intermediate longitudinal member 46. The members or elements 42—46 are rigidly interconnected by welding, as are other frame components to be presently described.

Another or intermediate longitudinal member 47 is disposed directly below the member 46 and midway between the members 42 and 43. The members 43 and 47 lie in a common horizontal plane. The member 47 is somewhat shorter than the member 43 and is rigidly secured to the upper longitudinal member 46 by a pair of vertical braces 48 and 49 and is rigidly secured to the outer member 43 by a pair of transverse braces 50 and 51.

A fifth, relatively short, longitudinal member 52 runs between and is rigidly secured at opposite ends respectively to the transverse braces 50 and 51. This member and the proximate portion of the member 43 serve to carry a wheel support comprising a pair of U-shaped elements 53 and 54 that lie respectively in parallel longitudinal planes through the members 52 and 43. The framework to the left of the frame member 42 (as viewed in Fig 3) comprises a carrying part of the frame F that is positioned laterally outwardly (here to the left) of or beyond the traction wheel 26.

The supports or elements 53 and 54 respectively carry plates 55 and 56 apertured in alinement at 57 and 58 to carry a transverse axle 59 (Figure 3) on which is journaled a single wheel 60 that provides ground-engaging or load-sustaining means for carrying the frame F, this wheel traveling alongside the row R¹ so that said row is straddled by the wheels 26 and 60. The frame F carries upwardly extending supports including longitudinally spaced bearings 61 and 62 alined on a longitudinal axis for pivotally supporting the basket B. These bearings are directly above that portion of the frame structure on which the wheel-supporting structure 53—54 is carried, so that the weight of the basket is appropriately distributed between the wheel 50 and the proximate traction wheel 26, as will be brought out later. The bearing 61 is at the upper end of a triangular structure made up of a vertical tubular member 63, an upwardly and outwardly inclined tubular brace 64 and the outer portion of the front arch 44. The bearing 62 is of similar construction, comprising tubular members 65 and 66 and the outer portion of the rear arch 45. A longitudinal arched member 67 extends between inner portions of the front and rear arches 44 and 45 to provide means for supporting that portion of the basket B adjacent the inner or tractor side of the frame F.

*Mounting of the frame F on tractor T*

As described above, the outer rear portion of the frame F is carried on the support or load-sustaining element comprising the single wheel 60. The frame is further carried on the tractor T by a pair of longitudinally spaced, front and rear, load-sustaining elements or mounting means, each of which will be presently described. The forward end of the longitudinal support or inner frame element 42 is provided with a laterally inwardly extending arm 68, preferably rigidly secured to the member 42, as by welding, and braced by a gusset 69. The arm 68 is apertured on a longitudinal axis at 70 (Figure 9) to receive a cooperating mounting element in the form of a longitudinally extending stud or pintle 71 mounted on the tractor T by means of the forward extension E. The mounting of the pintle or stud 71 on the forward extension places this part of the mounting means at the extreme forward end of the tractor and thus in a position materially ahead of the location that would be available on the tractor without the extension E. The particular mounting of the pintle or stud 71 on the extension E may be varied to suit individual desires. That shown comprises a bracket 72 to which the pintle or stud is rigidly secured, as by welding. This bracket is rigidly secured to a forward part of the left-hand extension side member 30. Normally, the mounting means comprising the cooperative elements 68 and 71 is enclosed by an appropriate shield 73a. This shield is provided for the purpose of eliminating tangling of the mounting means with the cotton plants. The shield has been omitted from the view in Figure 4.

The arm 68 on the forward end of the member or element 42 is relatively long and extends tractor-wards to such extent as to dispose the pivot 70—71 relatively close to the longitudinal center line of the tractor. The lever arm 68 is made as long as possible so as to materially reduce the length of the lever arm between the tractor center line and the point 70—71. In other words, it is important to keep the latter lever arm as short as possible to eliminate or minimize twist about the longitudinal center line of the tractor.

The member or element 42 is provided at its rear end with part of a second mounting means, this part comprising a depending bracket or arm 73 apertured at 74 on a generally longitudinal axis and rigidly secured to the member 42, as by welding at 75 (Figure 7). The other part of the rear mounting means or second load-sustaining element with which the part or arm 73 cooperates comprises a forwardly extending pintle or stud 76 rigidly secured to and extending forwardly from the left-hand rear axle housing 22.

As best seen in Figure 4, the rear mounting means 73—76 is located substantially intermediate the center line of the tractor and the longitudinal plane of the left-hand traction wheel 26. This mounting means is thus relatively remote from the center line of the tractor, as compared to the relatively close location of the front mounting element 68—71. Hence, the front and rear mounting means or elements lie on the line A—A, which line is non-parallel as respects the longitudinal center line of the tractor, and which arrangement places the mounting means 68—71 and 73—76 within the tread lines of the traction wheels 25 and 26.

Because of the forwardly advancing location of the mounting means 68—71 on the tractor body extension E, the distance between the front and rear mounting means is quite long. This distance bears a definite relationship to the distance between the front mounting means and the point of contact between the wheel 60 and the ground. In Figure 4, the line B—B is drawn between the two last mentioned points. The rear mounting means 73—76 is in substantial transverse alinement with the wheel 60. The line C—C in Figure 4 is drawn between the rear mounting means and the point of contact between the wheel 60 and the ground. Thus, the lines A—A, B—B, and C—C, when extended, intersect at the three load-sustaining elements respectively at the apices of the triangle thus formed. The entire frame F and its relationship to the tractor may be considered to be designed about this triangle which, as will hereinafter appear, serves also as the basis for mounting the picker P on the frame F.

*Picking unit and mounting thereof on frame F*

The picking unit may be of any desired construction. That shown is of the type in which cotton is picked by a plurality of rows or series of spindles which operate in orbits to enter and emerge from cotton plants along the row $R^1$. A picker of the type of which the presently disclosed picker is representative is shown in the U. S. patent to Johnston 2,140,631. This patent shows a pair of laterally spaced, longitudinally offset picker drums which operate at opposite sides of the cotton plants along a row, the spindles entering the plants and being barbed to wind cotton thereon as they ortate. In the present case, the picker drums are shown generally by dotted circles 77 and 78. Since the picker details may vary, only a diagrammatic showing has been resorted to. The relationship of the picker drums 77 and 78 to the row $R^1$ may be readily perceived and will serve to illustrate the general relationship of the picker to the frame F and the structural characteristics involved in so far as concerns the mounting of the picker P on the frame F. The drums 77 and 78 are substantially completely enclosed, except at their inner sides, in a housing made up of an upper or top casting 79 which is secured to a top place 80. Vertical and longitudinally extending side sheets 81 complete the housing or enclosure. The side sheet 81 lies laterally beyond the inner plane or face of the wheel 60 and the inner side sheet lies in the laterally opposite direction beyond or inwardly of the outer plane or face of the left-hand traction wheel 26. A pair of forwardly extending, laterally spaced dividers 82 provide a throat or entrance to the interior of the unit so that, as the machine travels forwardly along the row, cotton in that row may be engaged by the spindles on the drums 77 and 78. Cotton may be removed from the spindles by any suitable means, such as the doffing means illustrated in the patent referred to above. The cotton, when removed from the spindles, is conveyed to the basket B by the blower means comprising the ducts D and $D^1$ and the fans V. As previously stated, the basket B is pivoted on the basket-supporting bearings 61 and 62 for swinging about a longitudinal horizontal axis so that the contents of the basket may be dumped into a suitable vehicle or other receptacle.

It will be appreciated that the picking unit P is of considerable weight, most of which is concentrated about the drums 77 and 78, since these drums, as aforesaid, comprise a plurality of rows or series of spindles. The interior driving mechanism for these spindles adds material to the weight of the unit. Therefore, it is important to carry the unit in its most advantageous location on the frame F, having due regard to the centering of the unit on the row $R^1$ and the distribution of the weight of the unit between the frame F and the tractor T. As will be evident from an examination of Figure 4, the drums 77 and 78 are located in close proximity to the line B—B which extends between the front mounting means 68—71 and a vertical line projected upwardly from the point of contact between the wheel 60 and the ground. The frame F is provided with a transverse rockshaft 83 from which a pair of arms 84, 85 extend forwardly. These arms are rigidly secured at their rear ends to the rockshaft 83 and are pivotally connected at their forward ends at 86 and 87, respectively, to the picker unit casting 79. The picker unit is thus suspended by the arms 84, 85 through the intermediary of the rockshaft 83 and adjusting or lifting means therefor. This adjusting means may be of any suitable type, that shown comprising a control arm 88 rigidly secured to the rockshaft 83 intermediate its ends and a fluid-pressure motor 89 connected between this arm and an anchor point 90 on the frame F. The arm 88, motor 89 and anchor point 90 are located in the longitudinal vertical plane of the longitudinal frame member 52. The anchor point 90 is rigidly secured to this frame member. A second arm 91 is rigidly secured to the rockshaft 83 inwardly of the lifting arm 88. This arm is secured to the forward end of counterbalancing or assist means comprising a series of longitudinally extending tension springs 92 which are anchored at their rear ends at 93 to the transverse brace 51 of the frame F. Figure 9 shows the anchors 90 and 93 and also shows a pair of transversely alined, apertured brackets 94 for the mounting of the transverse rockshaft 83.

*Picker and fan driving mechanism*

As previously described, the tractor includes the rearwardly extending power take-off shaft 41. This shaft provides the initial driving element for the picker and fan driving means. The power take-off shaft has keyed thereto a sprocket or pulley 95 about which is looped a driving chain or belt 96 (Figures 3 and 4). The rear portion of the frame member 42 carries a bearing hanger or bracket 97 which journals a longitudinally extending driven shaft 98 (Figures 5, 7 and 8). The forward end of the shaft 98 has keyed thereto a sprocket or pulley 99 about which is looped the chain or belt 96.

As previously mentioned, the longitudinal pivot axis A—A between the frame F and tractor T is non-parallel as respects the longitudinal center line of the tractor. Ordinarily, such arrangement would give no little difficulty as respects the drive between the power take-off shaft 41 and the driven shaft 98. However, in the present case, the bearing hanger 97 and shaft 98 are so arranged with respect to the frame F and pivot axis A—A as to eliminate any variation in the tension on the chain or belt 96 as the frame F moves vertically with respect to the tractor about the pivot axis A—A. This result is achieved by the disposition of the shaft 98 in such manner that the longitudinal axis thereof intersects the axis A—A at a point that lies in an erect transverse plane passed through the sprockets 95 and 99. Thus, the pivot between the tractor T and frame F, in so far as concerns the driving means 41, 95—99, is at the point K (Figure 4).

The rear end of the driven shaft 98 has keyed thereto a sprocket or pulley 100 from which drive is taken by means of a chain 101 to a sprocket 102 on a longitudinally extending shaft 103. This shaft extends lengthwise of the frame F just outwardly of and below the longitudinal frame member 46 (Figures 1, 2, 3 and 4). The rear end of the shaft is supported in a suitable bearing 104 carried in a bracket 105 rigidly secured to the rear end of the frame member 47 (Figure 9) and the forward end of the shaft enters and is journaled in a gear casing 106 forming part of the picker top casting 79 (Figure 4). Suitable gearing (not shown) is provided within the casting 79 for driving the components of the picker drums 77 and 78. Since these details form no part of the invention and since they may be varied accordingly to the types of picking units used, no further description thereof will be given.

The shaft 103 carries a second sprocket 107 rearwardly of the sprocket 102. A longitudinal shaft 108 is disposed above the shaft 103 (Figure 3) and has keyed thereto a double pulley 109 and a sprocket (not shown) driven by a chain 110 from the sprocket 107. The double pulley 109 serves by means of belts 111 and pulleys 112 to drive rotors (not shown) within the blowers or fans V.

Apart from the mounting of the bearing hanger 97 and the disposition of the shaft 98 with respect to the longitudinal pivot axis A—A, the particular driving means illustrated forms no part of the invention and could just as well be replaced by another.

*Mounting of bearing hanger 97 and shaft 98*

As previously described, the bearing hanger 97 is associated with the rear portion of the inner longitudinal frame member 42. As best shown in Figures 7, 8 and 9, the rear portion of the member 42 includes a pair of longitudinally spaced supports in the form of arcuate plates 113 and 114. These are rigidly secured to the member 42, preferably by welding. The bearing hanger 97 is substantially of tubular construction and has supporting means comprising front and rear hanger members 115 and 116, these being preferably welded to the tubular portion of the hanger 97. The hanger is normally suspended by means of the brackets 113 and 114 and two pairs of bolts 117 and 118. Certain of these bolts are removable to provide for a shiftable mounting of the hanger 97, as will appear from the following description of the structure with particular reference to Figure 8.

The rear hanger member 116 is provided with inner and outer apertures 119, only the inner of which is visible in Figure 8. The arcuate plate or bracket 114 is likewise provided with inner and outer apertures 120, only the inner of which is visible in Figure 8, the bolt 118 passing through the other of the apertures 120 and the other of the apertures 119. Normally, the remaining apertures 119 and 120 are alined and the other bolt 118 is passed therethrough. This supports the hanger in the position of Figure 5. It will be understood, of course, that the front hanger member and associated bracket 113 are similarly constructed. In its normal position, the hanger 97 depends below the member 42 and rearwardly of the proximate rear axle housing 22. Thus, the axle housing 22 is confined fore and aft between the mounting arm 73 and the hanger 97. In other words, the hanger 97 normally constitutes an obstruction to relative longitudinal movement between the tractor T and frame F necessary to mount or dismount the frame.

As will be apparent from Figure 8, and as will be further described below, the inner bolts 117 and 118 may be removed so that the hanger 97 may be swung upwardly about the longitudinally alined outer bolts 117 and 118. The path of swinging of the hanger and shaft and sprocket assembly is indicated by the double-ended arrow in Figure 8, which shows that the assembly will clear the inner face of the left hand traction wheel 26. Likewise, the new position of the hanger assembly is such that it clears the axle housing 22.

*Miscellaneous connecting structure, shields and mounting and dismounting of the frame F*

As shown in Figure 3, the initial driving connection comprising the power take-off sprocket 95, chain 96 and driven shaft sprocket 99 are enclosed by appropriate shielding 121. This shielding may be readily removed for accomplishing mounting or dismounting of the frame F. A second shield 122 (Figures 3, 5 and 6) is provided to enclose the drive between the shafts 98 and 103. The construction of this shield is best shown in Figure 6, wherein it will be seen that the shield comprises an elongated stiffening member in the form of an angle bar 123 to the vertical flange of which is secured a sheet metal plate 124. A supporting strip 125 is welded along the free edge of the other flange of the angle bar 123 and carries a sheet metal plate 126, the shield thus having the U-shaped cross sectional appearance. This shield 122 is supported at its inner end by means of the outer of the rear hanger bolts 118 and is supported at its outer end—or end adjacent the shaft 103—by means including a bracket 127 welded to the shaft bracket 105 (see also Figure 9). The reinforced structure of the shield 122 is such that it serves as a compression member between the shafts 98 and 103 to prevent displacement of these shafts because of tension in the drive chain 101.

As best shown in Figures 7 and 10, the front and rear mounting means, comprising respectively the components 68—71 and 73—76, are disconnectible between the tractor T and frame F. For this purpose, the front stud or pintle 71 carries a removable pin 128 and the rear stud or pintle 76 carries a removable pin 129. Assuming that the frame is mounted on the tractor and it is desired to remove the frame, the procedure is substantially as follows: The inner longitudinal member 42 is blocked from the ground or otherwise supported so that it will not be displaced vertically when the suport of the tractor is removed. Obviously, any support on the member 42 should be ahead of the rear axle housing 22. The outer portion of the frame will, of course, be carried on the wheel 60. Having supported the inner portion of the frame as suggested above, the shield 73ᵃ and the pins 128 and 129 may be removed. The power take-off shield 121 is next removed. The exposed power take-off drive chain 96 is also removed.

The shield 122 is disconnected from its supporting portions at 118 and 127 so that the drive chain 101 may be disconnected between the sprockets 100 and 102. The removal of the shield 122 necessitates the removal of the outer of the rear bolts 118; however, this bolt may be immediately replaced to serve as a pivot for the bearing hanger assembly 97. With the shields and chains removed, the inner of the mounting bolts 117 and 118 may be removed and the hanger assembly swung to the position of Figure 8. The tractor may then be driven rearwardly with respect to the frame F.

Remounting of the picker unit and frame on the tractor is just as easily accomplished. Inasmuch as the connections at 68—71 and 73—76 are of the forward drive-in type, the tractor may be driven forwardly into place alongside the supported frame F so that the pintles or studs 71 and 76 respectively enter the apertured arms 68 and 73, after which the pins 128 and 129 are replaced and the driving connections effected and shields installed. The extraneous supporting structure utilized to temporarily support the frame F may be removed and the tractor and frame F are again ready for utilization as a unit.

*Summary*

As previously mentioned, the relationship between the load-sustaining elements comprising the wheel 60, the means 68—71 and the means 73—76 is important from the standpoint of supporting the picker unit T and basket B. It will be clear from an examination of Figure 4 that the weight of the auxiliary unit is appropriately distributed between the tractor and the carrying wheel 60. The inclination of the pivot axis A—A provides for disposition of the mounting means 68—71 relatively close to the longitudinal center line of the tractor. The forward extension E enables the forward mounting means to be disposed considerably farther forward than would be possible without such extension. Thus, the distance between the inner mounting elements is considerably increased. At the same time, the front mounting means is considerably farther ahead of the load-sustaining element comprising the carrying wheel 60. This arrangement provides for increased elongation of the frame F as respects its ability to carry the picker unit P at a point midway between the front mounting means and the carrying wheel 60. It will be appreciated in this respect that the picker unit P must be disposed directly ahead of the traction wheels 26 and carrying wheel 60. However, there are limitations on the extent to which the picker unit can be so forwardly disposed. For example, a forward disposition of the picker unit considerably ahead of that illustrated would tend to rock the frame F about the axis B—B, this imposing additional load on the front end of the tractor and lightening the load on the proximate traction wheel 26. Now, if the front mounting means were caused to be disposed rearwardly of the seat S, for example, the now longest side of the imaginary triangle whose apices are formed by the mounting elements would be considerably shortened. Therefore, the picker unit would overhang the new axis corresponding to but rearwardly of the axis B—B, thus imposing considerable twist on the frame F and leading to the results mentioned above.

The disposition of the mounting means 73—76 at the point intermediate the tractor center line and the left-hand traction wheel 26 is desirable for many reasons. Obviously, the theoretically perfect load-supporting connection would be on the tractor center line. However, there must be taken into consideration the basic design of the tractor and the desire not to materially alter the tractor. Location of the mounting means at the center of the tractor, as suggested, would interfere, in the particular case illustrated, with the normal seat mounting at 28. Ordinarily, this is of no importance in itself, except that in the case of the presently illustrated tractor, the seat mounting is over power lift or power control mechanism. In any case, such mounting would be directly over the transmission and final drive gearing and would not only require special reenforcing of the gear casing but would also interfere with the normal location of the transmission controls.

Various other features and objects of the invention not specifically enumerated above will undoubtedly occur to those versed in the art, as likewise will numerous modifications and alterations in the preferred construction illustrated, all of which may be achieved without departing from the spirit and scope of the invention as defined in the appended claims.

What is claimed is:

1. A vehicle-attachable cotton harvester, comprising: an auxiliary frame including a first elongated and fore-and-aft extending frame member having front and rear ends provided respectively with front and rear spaced apart vehicle-attachable mounting means, said auxiliary frame further including a second fore-and-aft extending frame member spaced laterally from the first frame member and having front and rear ends, the rear end of said second frame member being substantially in transverse alinement with the rear end of the first frame member and said second frame member being materially shorter than the first frame member so that the front end of the first frame member is spaced a substantial distance ahead of the front end of the second frame member, said auxiliary frame further having a rear cross member cross-connecting the rear ends of the first and second frame members and a front cross member cross-connecting the front end of the second frame member and a portion of the first frame member intermediate the front and rear ends of said first frame member; ground-engaging wheel means sustaining the auxiliary frame and rotatable on an axis normal to the first and second frame members and positioned laterally intermediate said first and second frame members and longitudinally intermediate the front and rear cross members; a cotton harvesting unit positioned ahead of and at a level below the front cross member; a transverse support sustained by the auxiliary frame and positioned intermediate the front and rear cross members; means connected to the transverse support and extending forwardly to a supporting connection with the cotton harvesting unit; a cotton receptacle supported on and above the auxiliary frame and having front and rear ends and opposite sides respectively substantially in upright planes extended through the first and second frame members and the front and rear cross members; and conveying means connected to the cotton harvesting unit and leading to the receptacle.

2. A vehicle-attachable cotton harvester, comprising: an auxiliary frame including a first elongated and fore-and-aft extending frame member having front and rear ends provided respectively with front and rear spaced apart vehicle-attachable mounting means, said auxiliary frame further including a second fore-and-aft extending frame member spaced laterally from the first frame member and having front and rear ends, the rear end of said second frame member being substantially in transverse alinement with the rear end of the first frame member and said second frame member being materially shorter than the first frame member so that the front end of the first frame member is spaced a substantial distance ahead of the front end of the second frame member, said auxiliary frame further having a rear cross member cross-connecting the rear ends of the first and second frame members and a front cross member cross-connecting the front end of the second frame member and a portion of the first frame member intermediate the front and rear ends of said first frame member; ground-engaging wheel means sustaining the auxiliary frame and rotatable on an axis normal to the first and second frame members and positioned laterally intermediate said first and second frame members and longitudinally intermediate the front and rear cross members; a cotton harvesting unit positioned ahead of and at a level below the front cross member; a transverse support sustained by the auxiliary frame and positioned intermediate the front and rear cross members; and means connected to the transverse support and extending forwardly to a supporting connection with the cotton harvesting unit.

3. A vehicle-attachable cotton harvester, comprising: an auxiliary frame including a first elongated and fore-and-aft extending frame member having front and rear ends provided respectively with front and rear spaced apart vehicle-attachable mounting means, said auxiliary frame further including a second fore-and-aft extending frame member spaced laterally from the first frame member and having front and rear ends, the rear end of said second frame member being substantially in transverse alinement with the rear end of the first frame member and said second frame member being materially shorter than the first frame member so that the front end of the first frame member is spaced a substantial distance ahead of the front end of the second frame member, said auxiliary frame further having a rear cross member cross-connecting the rear ends of the first and second frame members and a front cross member cross-connecting the front end of the second frame member and a portion of the first frame member intermediate the front and rear ends of said first frame member; ground-engaging wheel means sustaining the auxiliary frame and rotatable on an axis normal to the first and second frame members and positioned laterally intermediate said first and second frame members and longitudinally intermediate the front and rear cross members; a cotton harvesting unit carried by the auxiliary frame and positioned ahead of and at a level below the front cross member; a cotton receptacle supported on and above the auxiliary frame and having front and rear ends and opposite sides respectively substantially in upright planes extended through the first and second frame members and the front and rear cross members; and conveying means connected to the cotton harvesting unit and leading to the receptacle.

TALBERT W. PAUL.

References Cited in the file of this patent

UNITED STATES PATENTS

| Number | Name | Date |
|---|---|---|
| 1,722,747 | Hent | July 30, 1929 |
| 1,879,823 | Ray | Sept. 27, 1932 |
| 2,335,942 | Hyman | Dec. 7, 1943 |